(12) United States Patent
Lee et al.

(10) Patent No.: US 10,409,404 B2
(45) Date of Patent: Sep. 10, 2019

(54) METHOD OF PROCESSING TOUCH EVENTS AND ELECTRONIC DEVICE ADAPTED THERETO

(71) Applicant: SAMSUNG ELECTRONICS CO., LTD., Suwon-si, Gyeonggi-do (KR)

(72) Inventors: Jeongjin Lee, Seoul (KR); Sungjun Lee, Suwon-si (KR); Hyelin Lee, Suwon-si (KR); Seungmin Chung, Seoul (KR); Youngho Cho, Seoul (KR); Mooyoung Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/662,671

(22) Filed: Jul. 28, 2017

(65) Prior Publication Data

US 2018/0032195 A1 Feb. 1, 2018

(30) Foreign Application Priority Data

Aug. 1, 2016 (KR) ........................ 10-2016-0098194

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G06F 3/0416* (2013.01); *G06F 3/0488* (2013.01); *G06F 3/03545* (2013.01)

(58) Field of Classification Search
CPC .................................. G06F 3/04; G06F 3/048
See application file for complete search history.

(56) References Cited

U.S. PATENT DOCUMENTS

2009/0184935 A1 7/2009 Kim
2011/0285645 A1 11/2011 Cho et al.
(Continued)

FOREIGN PATENT DOCUMENTS

KR 10-2007-0071917 7/2007
KR 10-2009-0079405 7/2009
(Continued)

OTHER PUBLICATIONS

Search Report dated Nov. 29, 2017 in counterpart International Patent Application No. PCT/KR2017/008279.
(Continued)

*Primary Examiner* — Joseph R Haley
(74) *Attorney, Agent, or Firm* — Nixon & Vanderhye P.C.

(57) ABSTRACT

A method of processing touch events and an electronic device adapted to the method are provided. The electronic device includes: a touch screen; a processor electrically connected to the touch screen; a touch control circuit, electrically connected to the touch screen and the processor, the touch control circuit configured to create a touch event in response to a touch input detected on the touch screen; and a memory electrically connected to the processor. The processor is configured to execute at least one application stored in the memory, to determine attribute information of the executed application, to generate touch area information containing an attribute corresponding to at least part of the area of the touch screen and information regarding at least part of the area of the touch screen, based on the attribute information, and to provide the touch area information to the touch control circuit. The touch control circuit determines whether a touch event corresponding to the detected touch input is created, based on the touch area information.

18 Claims, 18 Drawing Sheets

(51) Int. Cl.
*G06F 3/0488* (2013.01)
*G06F 3/0354* (2013.01)

(56) References Cited

U.S. PATENT DOCUMENTS

| | | |
|---|---|---|
| 2012/0242617 A1 | 9/2012 | Lee |
| 2013/0222286 A1 | 8/2013 | Kang et al. |
| 2013/0222287 A1 | 8/2013 | Bae et al. |
| 2013/0234982 A1 | 9/2013 | Kang |
| 2013/0285956 A1 | 10/2013 | Kamii et al. |
| 2015/0002411 A1* | 1/2015 | Hwang ................ G06F 3/0416 345/173 |
| 2015/0015506 A1* | 1/2015 | Lares .................... G06F 3/0488 345/173 |
| 2016/0195986 A1 | 7/2016 | Kwon et al. |

FOREIGN PATENT DOCUMENTS

| | | |
|---|---|---|
| KR | 10-2011-0127555 | 11/2011 |
| KR | 10-2012-0109027 | 10/2012 |
| KR | 10-2013-0099696 | 9/2013 |
| KR | 10-2013-0099745 | 9/2013 |
| KR | 10-2015-0019352 | 2/2015 |

OTHER PUBLICATIONS

Extended European Search Report dated Jun. 26, 2019 for EP Application No. 17837215.7.

\* cited by examiner

METHOD OF PROCESSING TOUCH EVENTS AND ELECTRONIC DEVICE ADAPTED THERETO

CROSS-REFERENCE TO RELATED APPLICATION

This application is based on and claims priority under 35 U.S.C. § 119 to a Korean patent application filed on Aug. 1, 2016 in the Korean Intellectual Property Office and assigned Serial number 10-2016-0098194, the disclosure of which is incorporated by reference herein in its entirety.

BACKGROUND

1. Field of the Disclosure

The present disclosure relates generally to electronic devices, and for example, to a method of processing touch events and an electronic device with a touch screen adapted to the method.

2. Description of Related Art

With the development of mobile communication technology and processor technology, portable terminals (hereafter called electronic devices) have been equipped with various functions as well as a call function. For example, various Internet browsers, various types of applications, such as games, calculators, etc., are developed, and installed to run on electronic devices. In order to provide the functions to users, electronic devices need user interfaces which are easier and more convenient to use. To this end, electronic devices are equipped with a touch-based user interface. If a physical touch is applied to a point on the touch screen of an electronic device with a user's finger, a stylus pen, etc., the electronic device detects the touched point and performs a corresponding function.

If an electronic device is designed in such a way that the side is curved or the bezel area except for the touch screen is relatively narrow, a touch may be generated at the edge of the touch screen by a user's operation gripping the electronic device. In this case, the electronic device may recognize a user's operation gripping the electronic device as a touch input, and perform a corresponding function that the user did not intend to execute.

In order to address the problems, algorithms are needed to prevent and/or avoid electronic devices from mistaking a user's gripping for a touch input. Existing electronic devices equally set an area of the touch screen (e.g., part of the edge) as a dead zone where any touch is not detected.

However, electronic devices display various screens depending on applications which are executed, and thus areas (zones) to detect or not to detect touch input on the touch screen may vary. Therefore, the existing method of equally setting an area of a touch screen as a dead zone and the electronic device adapted to the method are not suitable for an environment where various applications run.

SUMMARY

The present disclosure addresses the above problems and disadvantages, and to provides at least the advantages described below. Accordingly, various example embodiments of the present disclosure provide a method and an electronic device capable of setting a touch sensing area of a screen and processing touch events, based on attributes of the screen displayed on electronic devices.

In accordance with an example aspect of the present disclosure, an electronic device is provided. The electronic device includes: a touch screen; a processor electrically connected to the touch screen; a touch control circuit, electrically connected to the touch screen and the processor, the touch control circuit being configured to create a touch event in response to a touch input detected on the touch screen; and a memory electrically connected to the processor. The processor is configured to execute at least one application stored in the memory, to determine attribute information of the executed application, to create touch area information including an attribute corresponding to at least part of the area of the touch screen and information regarding at least part of the area of the touch screen, based on the attribute information, and to provide the touch area information to the touch control circuit; wherein the touch control circuit is configured to determine whether a touch event corresponding to the detected touch input is created, based on the touch area information.

In accordance with another example aspect of the present disclosure, a method of processing touch events of an electronic device is provided. The method includes: executing at least one application; determining attribute information of the executed application; creating, when a touch input is detected on a touch screen, touch area information including an attribute corresponding to at least part of the area of the touch screen and information regarding at least part of the area of the touch screen, based on the attribute information; and determining whether a touch event corresponding to the detected touch input is created, based on the touch area information.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
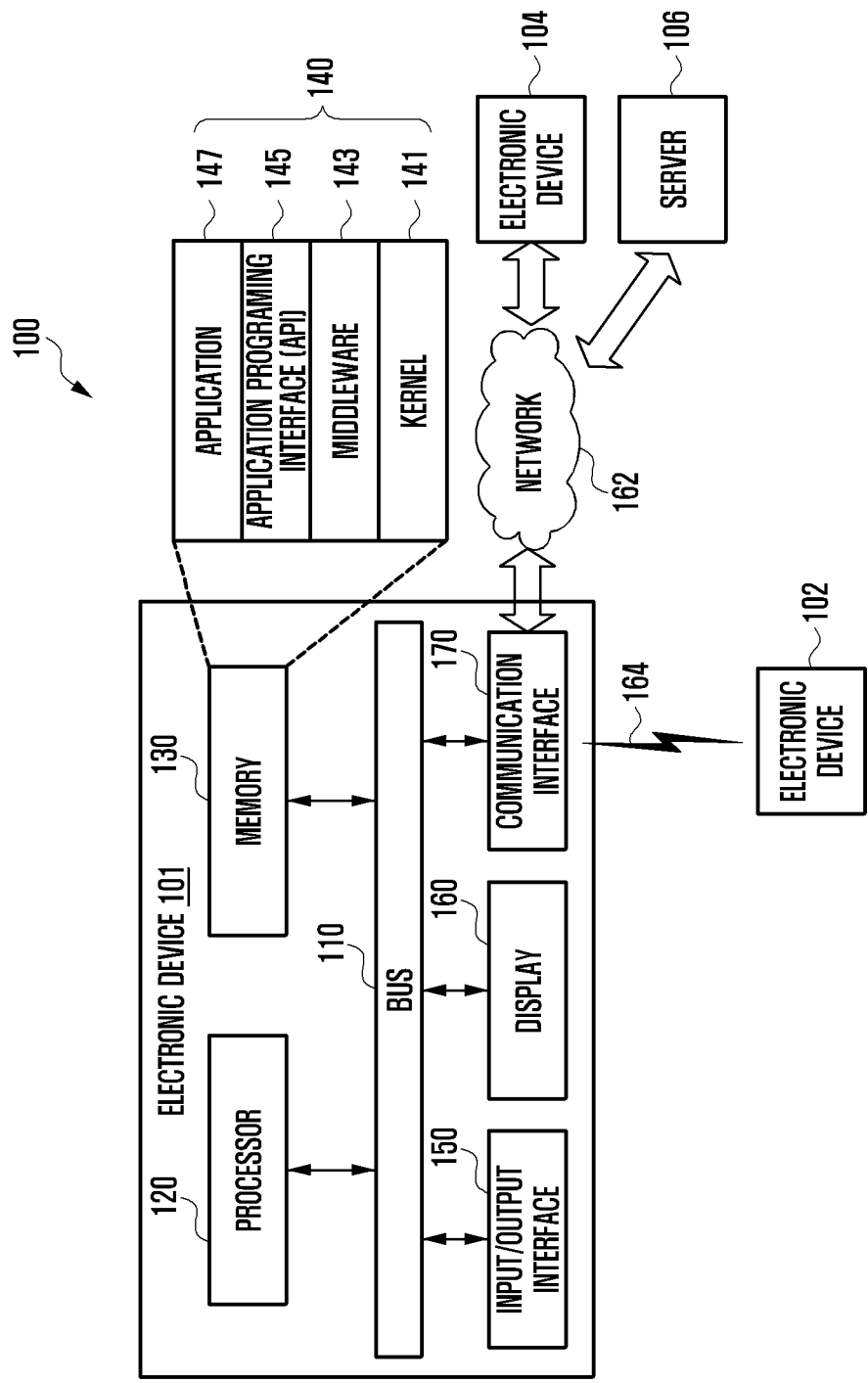
FIG. 1 is a diagram illustrating an example network environment including an electronic device according to various example embodiments of the present disclosure.

Hereinafter, various example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an example of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it may be described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not intended to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch), or the like, but is not limited thereto.

According to some example embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some example embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some example embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus 101 in a network environment 100 according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry and can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols 164, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
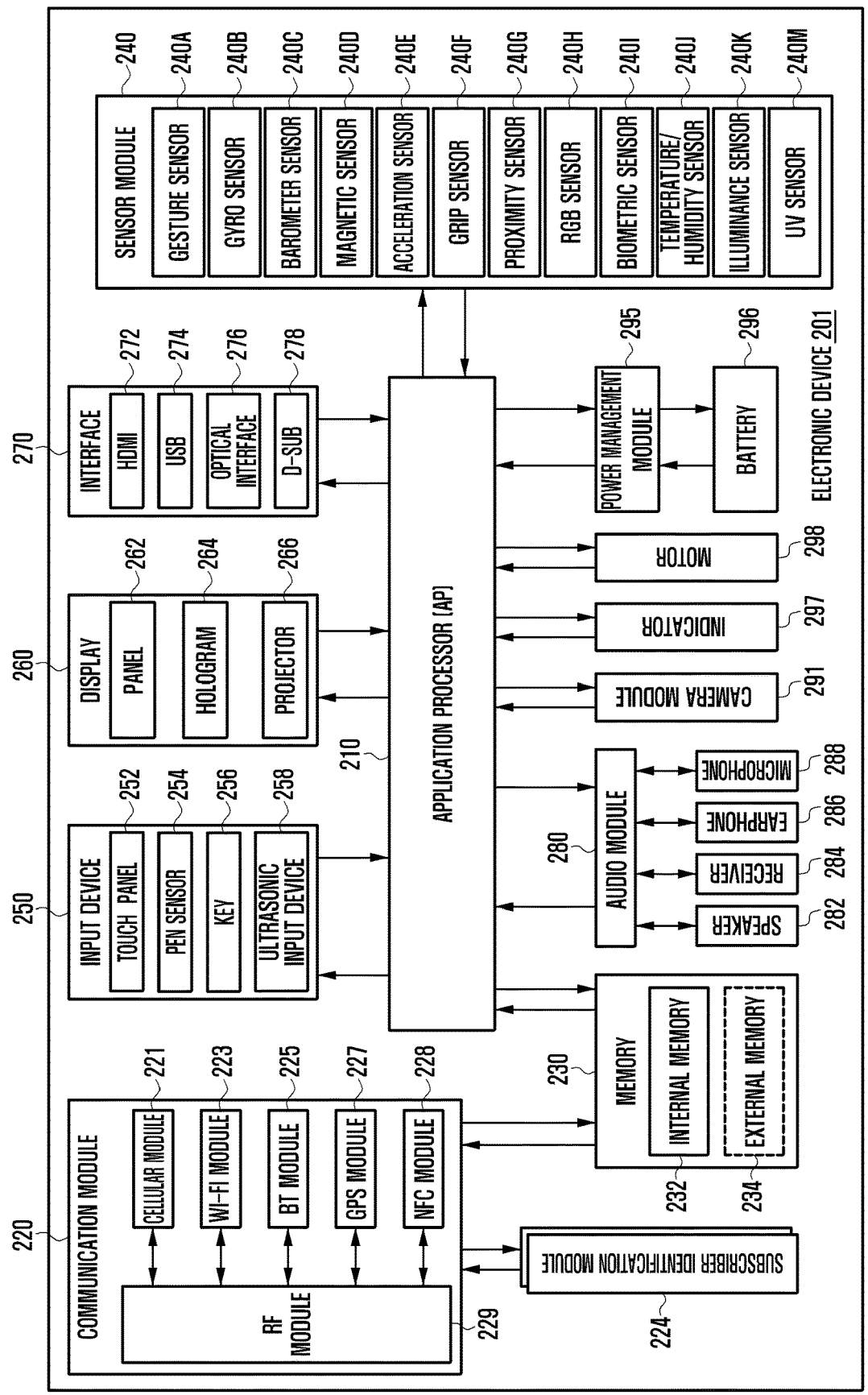
FIG. 2 is a block diagram illustrating an example electronic device according to various example embodiments of the present disclosure.

FIG. 2 is a block diagram illustrating an example electronic device 201 in accordance with an example embodiment of the present disclosure.

The electronic device 201 may form, for example, the whole or part of the electronic device 101 illustrated in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space.

Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electrical signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 260 shown in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
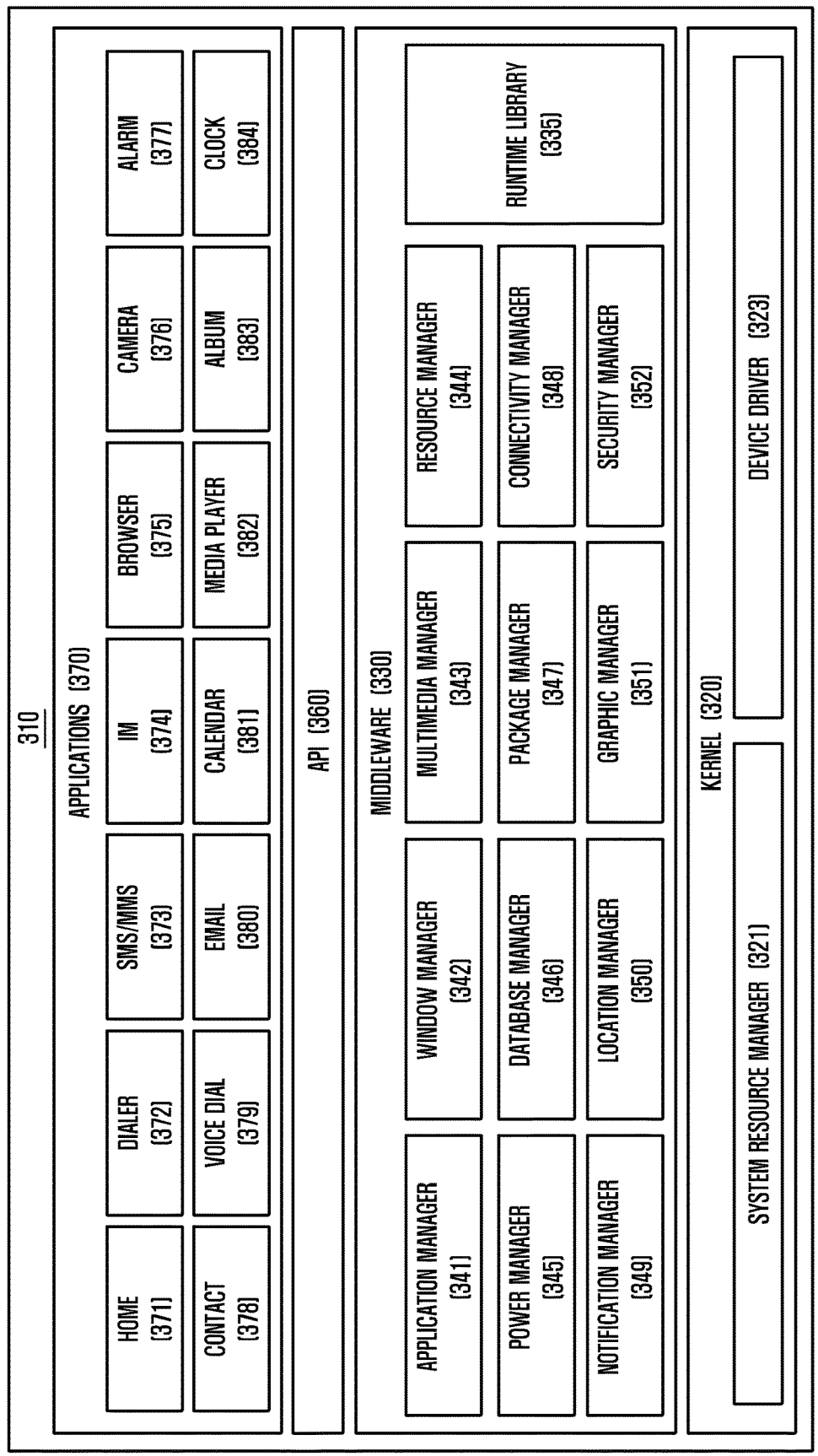
FIG. 3 is a block diagram illustrating an example program module according to various example embodiments of the present disclosure.

FIG. 3 is a block diagram illustrating an example configuration of a programming module 310 according to an example embodiment of the present disclosure.

The programming module 310 may be included (or stored) in the electronic device 201 (e.g., the memory 230) illustrated in FIG. 2 or may be included (or stored) in the electronic device 101 (e.g., the memory 130) illustrated in FIG. 1. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

As one of various embodiments of the present disclosure, the display driver may control at least one display driver IC (DDI). The display driver may include the functions for controlling the screen according to the request of the application 370.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

In various embodiments of the present disclosure, the overall area of a touch screen is divided into a normal zone, a dead zone and a grip zone. The normal zone is referred to as an area where a touch event occurs according to a touch input, and does not includes a dead zone and a grip zone of the overall area of the touch screen. The dead zone is referred to as an area where a touch event does not occur despite the presence of a touch input. The grip zone is referred to as an area where a touch is detected but a touch event may or may not occur according to a pattern of a touch input.

Figure 4:
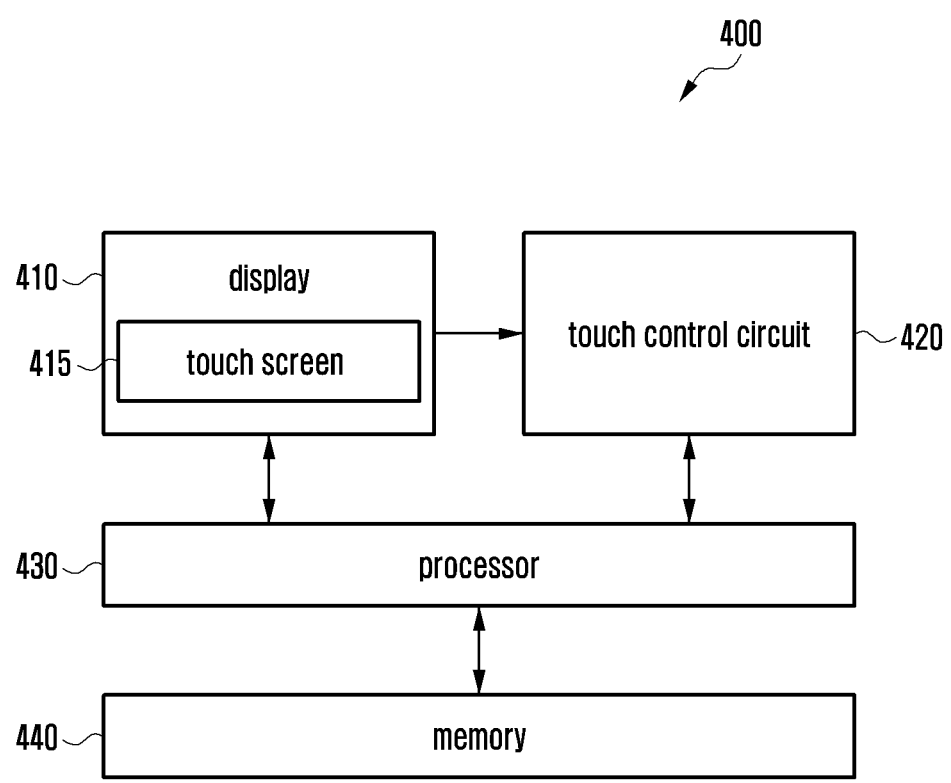
FIG. 4 is a block diagram illustrating an example electronic device according to various embodiments of the present disclosure.

FIG. 4 is a block diagram illustrating an example electronic device according to various example embodiments of the present disclosure.

As illustrated in FIG. 4, an electronic device 400 includes a display 410, a touch control circuit 420, a processor (e.g., including processing circuitry) 430 and a memory 440. Although the example embodiment is implemented in such a way as to include the components described above, it should be understood that the present disclosure is not limited thereto. It would be appreciated that the embodiment may also be modified in such a way that part of the components are omitted or replaced with other components, without departing from the scope and spirit of the present disclosure. The electronic device 400 may also include at least part of the configurations and/or functions of the electronic device 101 illustrated in FIG. 1 and/or the electronic device 201 illustrated in FIG. 2.

The electronic device 400 may be implemented with a portable electronic device, such as a smart phone, a tablet personal computer (table PC), etc., but is not limited thereto. For example, the electronic device 400 may include devices if they are capable of including a processor and a memory as the processor 430 and the memory 440, allow for the installation and the execution of applications, detect touch inputs via a touch screen as the touch screen 415, and perform corresponding functions.

In various example embodiments, the display 410 may display videos or images. The display 410 may be implemented with one of the following: a liquid crystal display (LCD), light-emitting diode (LED), organic LED (OLED), micro electro mechanical system (MEMS) display, and electronic paper display, or the like, but is not limited thereto. The display 410 may include at least part of the configurations and/or functions of the display 160 illustrated in FIG. 1 and/or the display 260 illustrated in FIG. 2.

The display 410 may be configured to include a touch screen 415. In this case, the touch screen 415 is capable of sensing a touch input or a hovering input applied to a window (not shown) installed to the front of the display 410. The touch screen 415 may be implemented with at least one of the following types of touch screens: capacitive overlay type, a pressure type, an infra-red type, and an ultrasonic type, but is not limited thereto. If the touch screen 415 is implemented with a capacitive type of touch screen, it has one or more sensors (not shown) at at least one or more corners. If the user applies a physical touch to an area of the touch screen 415 with his/her finger or a stylus pen, the change in capacitance occurs at the area. In this case, the sensor senses the capacitance change, e.g., an electrical characteristic, at the area, and thus recognizes the input touch. The touch screen 415 provides the sensed touch input to a touch control circuit 420 via an electrical connection. The touch control circuit 420 obtains information regarding the touch area and the touch pressure, based on the touch input. The touch screen 415 may include at least part of the configurations and/or functions of the touch panel 252 illustrated in FIG. 2.

The touch control circuit 420 is electrically connected to the touch screen 415 and the processor 430. The touch control circuit 420 is capable of receiving sensed touch inputs from the touch screen 415. The touch input may include a location (or coordinates) where a touch input is sensed and information regarding the touch pressure. The touch control circuit 420 is capable of creating a touch event in response to the received touch input and providing the touch event to the processor 430. The touch event may include a location where a touch is applied to on the touch screen 415, the touch pressure applied to the touch screen 415, and time when the touch is applied to on the touch screen 415.

In various example embodiments, the memory 440 may be implemented with volatile memory and non-volatile memory, but is not limited to the examples of the volatile memory and non-volatile memory. The memory 440 is disposed in the housing and is electrically connected to the processor 430. The memory may include at least part of the configurations and/or functions of the memory 130 illustrated in FIG. 1 and/or the memory 230 illustrated in FIG. 2.

The non-volatile memory may include at least one of the following: one time programmable ROM (OTPROM), PROM, EPROM, EEPROM, mask ROM, flash ROM, flash memory, hard drive, and Sold State Drive (SSD), but is not limited thereto. The non-volatile memory stores a number of applications. It should be understood that the non-volatile memory is not restricted in storage, in terms of type and number of applications. The non-volatile memory is capable of storing various instructions to be executed by the processor 430. The instructions may include control commands recognized by the processor 430, such as input/output functions, a data moving function, arithmetic and logic operations. The instructions may be defined on frameworks stored in the non-volatile memory. The non-volatile memory may store at least part of the program module 310 shown in FIG. 3.

The volatile memory may include at least one of the following: DRAM, SRAM, and SDRAM, but is not limited thereto. The processor 430 is capable of loading data, applications, instructions, etc., stored in the non-volatile memory, on the volatile memory, and executing corresponding functions in the electronic device 400.

In various example embodiments, it should be understood that the processor 430 may include various processing circuitry and is not limited in implementing data operations and data process functions in the electronic device 400. However, for the sake of convenience, the following embodiments are described in such a way that the processor 430 creates touch area information, based on information stored in the memory 440 and attribute information received from applications, and transfers the created information to the touch control circuit 420.

The processor 430 may include various processing circuitry and is capable of performing its operations/functions, which will be described later, by loading instructions stored in the memory 440 which are described above. The processor 430 may include at least part of the configurations and/or functions of the processor 120 illustrated in FIG. 1 and/or the processor 210 illustrated in FIG. 2.

The processor 430 according to various embodiments of the present disclosure detects a touch input and then creates touch area information including information related to a dead zone where a touch event does not occur.

In various embodiments, the touch area information may include at least part of the area of the touch screen 415 and an attribute corresponding to at least part of the area of the touch screen 415. Various types of parameters related to touches applied to the touch screen may be applied to the attribute corresponding to at least part of the area of the touch screen 415.

In various embodiments, the touch area information may include information related to a dead zone where any touch event does not occur when a touch input is sensed on touch screen 415 and/or information related to a grip zone to determine whether a touch event occurs based on a pattern of a touch input. The touch area information may employ parameters related to a touch sensed at at least part of the area of the touch screen 415, such as thresholds of area and touch pressure which allow for the occurrence of a touch event, a scan cycle of a touch sensing, the alteration of touch sensitivity, a condition as to whether the transfer of touch coordinates is enabled/disabled, etc., but is not limited thereto.

In an example embodiment, the touch area information may include information regarding coordinates of a dead zone. For example, the touch area information may include information regarding a range of (x, y) coordinates of a dead zone. In an embodiment, the touch area information may be defined as distances from top/bottom/left/right lines of the touch screen 415. For example, the touch area information may be defined as left/right 10 pixels based on the resolution of the touch screen 415 or left/right 2 mm based on the length. In this case, the area of 10 pixels (or 2 mm) in the center/middle direction from the left and right edges of the touch screen 415 may be set as a dead zone. It should be understood that the definition type of touch area information as described above is an example, and the present disclosure is not limited by the definition types of touch area information.

In an example embodiment, the touch area information may further include information related to a grip zone to determine whether a touch event occurs based on a pattern of a touch input. For example, if the touch control circuit 420 ascertains (determines) that: a pattern of a touch input applied to a grip zone on the touch screen 415 is a pattern of a number of touches that are simultaneously applied to a grip zone, a pattern of a single touch whose area is relatively large or a number of touches whose area is relatively large, etc., it considers the ascertained (determined) pattern to be a pattern created by a user's gripping operation, and thus may not create a touch event. On the other hand, if the touch control circuit 420 determines that a pattern of a touch input is a pattern of a single touch, a pattern of an input touch whose width is narrow, etc., it considers the sensed touch to be a touch that the user intends to input, and thus may create a touch event.

In various example embodiments, the processor 430 is capable of creating touch area information by the combination of a number of layers including information related to a dead zone. For example, each of a number of layers may include information regarding coordinates of a dead zone, information regarding coordinates of a normal zone, and information regarding coordinates of a grip zone.

The processor 430 is capable of providing the created touch area information to the touch control circuit 420. The touch control circuit 420 stores touch area information. If the touch control circuit 420 detects a touch input via touch screen 415, it is capable of determining whether the area to which the touch input is applied is a normal zone, a dead zone, or a grip zone, based on the touch area information. To this end, the touch control circuit may include a separate built-in memory (not shown) or an area of the memory 440 may be assigned to store touch area information of the touch control circuit.

If an area to which a touch is applied is a normal zone, the touch control circuit 420 creates a touch event and provides it to the processor 430. If an area to which a touch is applied is a dead zone, the touch control circuit 420 does not create a touch event. If an area to which a touch is applied is a grip zone, the touch control circuit 420 does not create a touch event if it considers (determines) a touch pattern to be a pattern by a user's gripping operation and creates a touch event if it considers (determines) a touch pattern to be a normal touch.

In various example embodiments of the present disclosure, if the touch control circuit 420 does not generate a touch event, it may not transfer an electrical signal according to a touch event to an application although the user applies a touch to a corresponding area. This may lead to a reduction in the power consumption which is caused by the occurrence of a touch event by the touch control circuit 420, compared with the system configured in such a way that the touch control circuit 420 generates a touch event and an application ignores an unnecessary touch input. In an embodiment, the processor 430 is capable of determining whether it provides a touch event to an application, based on touch area information, without providing touch area information to the touch control circuit 420. In the embodiment, the processor 430 is capable of creating touch area information, based on attribute information regarding an application, and storing the created touch area information in a framework. If a touch input is sensed via the touch screen 415, the touch control circuit 420 creates a touch event and provides the touch event to the processor 430. The processor 430 is capable of determining whether an area where the received touch event occurs is a normal zone, a dead zone or a grip zone, based on the touch area information stored in the framework. If the area where a touch event occurs is a normal zone, the processor 430 provides the touch event to an application. If the area where a touch event occurs is a dead zone, the processor 430 does not provide the touch event to an application. If the area where a touch event occurs is a grip zone, the processor 430 determines whether it needs to provide the touch event to an application according to touch patterns.

In an example embodiment, the layers include: a first layer including information regarding a dead zone, as a default layer; a second layer including information regarding a zone of the dead zone in the first layer, which needs to be altered to a normal zone; and a third layer including information regarding at least part of the first layer, which needs to be reconfigured.

In an example embodiment, the first to third layers may define specified coordinates as different areas, respectively. For example, a first layer may define specified coordinates (x1, y1) as a dead zone, and second layer may define specified coordinates (x1, y1) as a normal zone. In this case, corresponding coordinates (x1, y1) may be defined according to priority of the first to third layers. With respect to the same coordinate area, the second layer has high priority than the first layer, and the third layer has high priority than the first layer and the second layer.

In an example embodiment, the first to third layers may include only information regarding coordinates of a dead zone and/or a grip zone. Alternatively, the first to third layers may include information regarding coordinates of a dead zone, a grip zone, and a normal zone. For example, if the first layer defines only a dead zone, and the third layer needs to re-set a part of the first layer, not defined as a dead zone, to a dead zone, information regarding coordinates for the corresponding area may be included. In addition, the first layer may include information regarding coordinates of a dead zone and information regarding coordinates of a normal zone. The third layer may include information regarding a zone of the normal zone in the first layer, which needs to be altered to a dead zone.

In an example embodiment, the second layer and/or the third layer may include a number of sub-layers defined for the top/bottom/left/right areas of the touch screen 415.

The stack structure (superimposition structure) of a number of layers described above is described in greater detail below, with reference to FIGS. 5 to 8.

In various example embodiments, the processor 430 determines attribute information regarding an executed application, and creates touch area information, based on the attribute information. The attribute information regarding an application may include information regarding a dead zone and/or a grip zone to be applied to a corresponding application. The processor 430 receives the attribute information each time that a screen created by an application is altered, and re-creates touch area information when receiving the attribute information. In an embodiment, the attribute information of an application may be provided to a processor (or framework) via an application processor interface (API).

In various embodiments, the processor 430 obtains at least part of a number of layers configuring touch area information from attribute information provided by an application, and other parts from information stored on a framework.

For example, a first layer including information regarding a dead zone may be stored on a framework or in an area of the memory 440 of the electronic device 400, as a default. If a specified application is not executed or attribute information is not provided from an application, the processor 430 may create touch area information based on a first layer. An area not defined in a second layer and a third layer may be determined as a normal zone, a dead zone or a grip zone, according to a first layer.

A second layer including information regarding a zone of the dead zone in the first layer, which needs to be altered to a normal zone, and a third layer including information regarding a zone of a normal zone in the first layer, which needs to be altered to a dead zone, may be included in attribute information provided by an application. If attribute information is created from an application after the processor 430 creates touch area information, according to a first layer, as a default, the processor 430 may combine the first to third layers with each other, thereby creating touch area information.

In an example embodiment, a first layer may be stored in the touch control circuit 420, and touch area information may include only information regarding a second layer and a third layer. In this case, in a state where the touch control circuit 420 does not receive touch area information from the processor 430, the touch control circuit 420 is capable of determining whether a touch event occurs, based on a first layer set as a default. The processor 430 creates touch area information by combining the second and third layers included in the attribute information of an application, and provides the created touch area information to the touch control circuit 420. The touch control circuit 420 combines information regarding the second and third layers received from the processor 430 with the first layer, and determines whether a touch event according to a touch input occurs, based on the combined result.

In various embodiments, the electronic device 400 is capable of simultaneously executing a number of applications on the foreground. In this case, screens of the applications may be simultaneously displayed on the touch screen 415. The processor 430 ascertains (determines) attribute information regarding each of the applications executed on the foreground, and creates touch area information based on ascertained attribute information. Pieces of touch area information are created for individual applications and scaled according to the sizes of screens displaying the applications, separately and respectively. Alternatively, pieces of touch area information are created for the overall area, employing attribute information of the individual applications.

In various embodiments, the touch area information includes information regarding a normal zone, a dead zone, and a grip zone, and also a threshold of touch pressure that allows for the occurrence of a touch event when a touch is detected at corresponding coordinates. For example, a touch event corresponding to only a touch whose pressure level is greater than a first threshold occurs in a first area. In addition, a touch event corresponding to only a touch whose pressure level is greater than a second threshold greater than the first threshold occurs in a second area. In various example embodiments, the touch area information may also include information regarding a threshold of touch area. For example, a touch event corresponding to only a touch whose area is greater than or equal to a first threshold occurs in the first area. In addition, a touch event corresponding to only a touch whose area is greater than or equal to a second threshold occurs in the second area.

The touch area information may employ various types of parameters related to touches applied to a touch screen. For example, the touch area information may employ parameters, such as a scan cycle of a touch sensing, the alteration of touch sensitivity, a condition as to whether the transfer of touch coordinates is enabled/disabled, etc., but is not limited thereto.

In various embodiments, the processor 430 corrects a dead zone of the first and/or third layer, based on a sensed value of at least one sensor of the electronic device 400. Examples of the sensor are a tilt sensor, an acceleration sensor, a gravity sensor, etc. Examples of the sensed value are values corresponding to the orientation, tilt, moving speed, etc. of the electronic device 400. A more detailed description will be provided below, with reference to FIGS. 9 and 10.

Figure 5A:
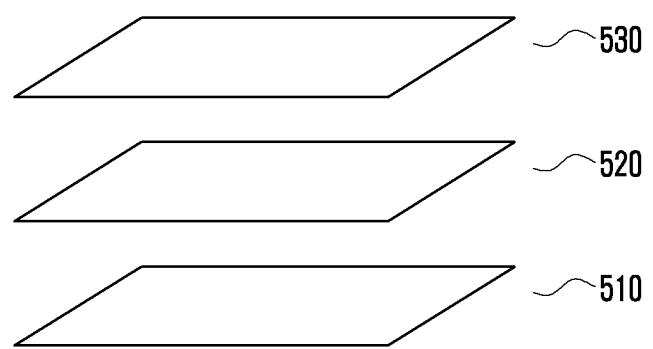
FIGS. 5A, 5B and 5C are diagrams illustrating example layer structures of touch area information according to various example embodiments of the present disclosure.
Figure 5B:
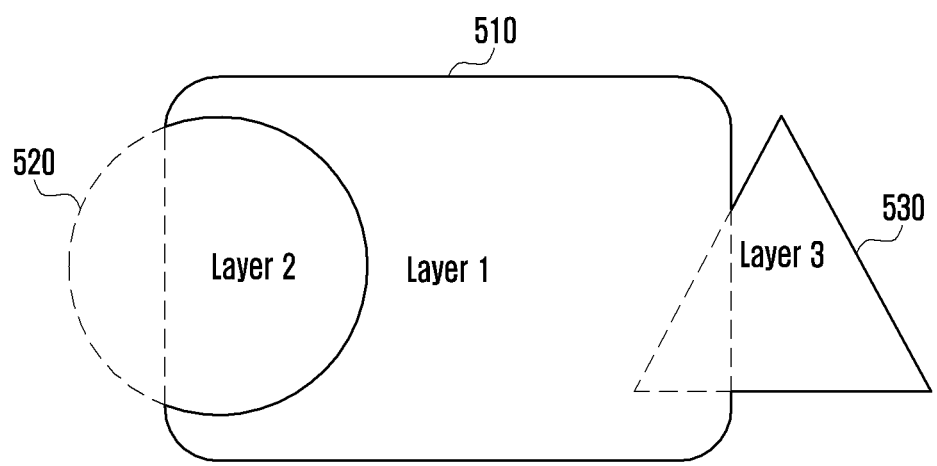
Figure 5C:
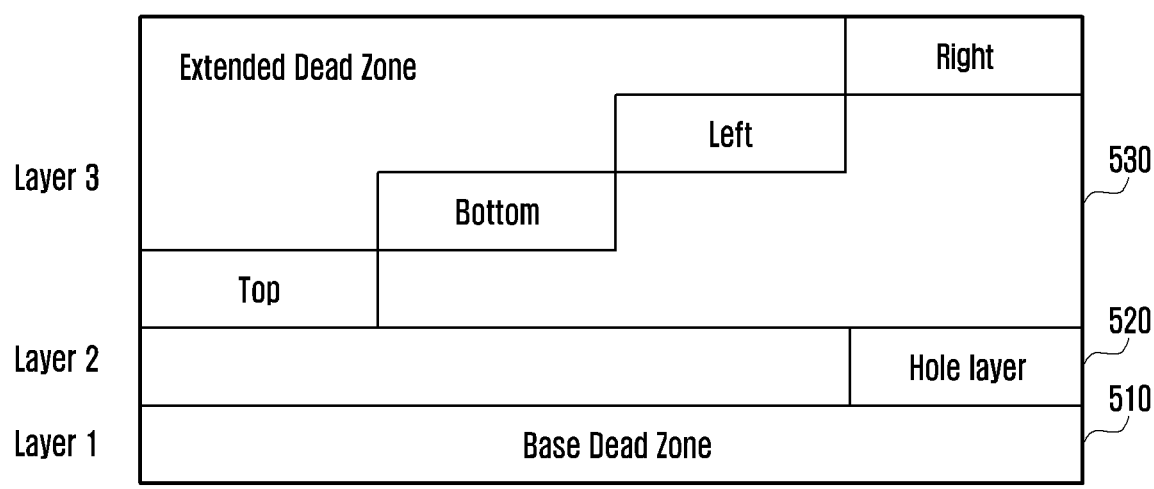

FIGS. 5A, 5B and 5C are diagrams illustrating example layer structures of touch area information according to various example embodiments of the present disclosure.

As illustrated in FIG. 5A, touch area information includes information regarding a number of layers, e.g., first layer 510 to third layer 530.

In various embodiments, touch area information includes information regarding: a first layer 510 including information regarding a dead zone, as a default; a second layer 520 including information regarding a zone of the dead zone in the first layer 510, which needs to be altered to a normal zone; and a third layer 530 including information regarding a zone of the normal zone in the first layer 510, which needs to be altered to a dead zone. The first layer 510, second layer 520, and third layer 530 may also be defined as a base dead zone, a hole layer, and an extended dead zone, respectively.

In an embodiment, with respect to the same coordinate area, the second layer 520 may have high priority than the first layer 510, and the third layer 530 may have high priority than the first layer 510 and the second layer 520. For example, the first layer 510 at specified coordinates (x2, y2) may be defined as a dead zone; however, if the second layer 520 defines the coordinates (x2, y2) as a zone to be altered to a normal zone, the coordinates (x2, y2) may be determined as a normal zone. In addition, the first layer 510 at specified coordinates (x3, y3) is not set to a dead zone; however, if the third layer 530 defines the coordinates (x3, y3) as a zone to be altered to a dead zone, the coordinates (x3, y3) may be determined as a dead zone.

FIG. 5B is a diagram illustrating a layer created as first to third layers 510, 520, and 530 are superimposed (overlapped).

As illustrated in FIG. 5B, a dead zone may be extended in such a way that: an area in the second layer 520, defined to be altered to a normal zone, subtracts from the area in the first layer 510, defined as a dead zone; and an area in the third layer 530, defined to be altered to be a dead zone, subtracts from the area in the first layer 510, not defined as a dead zone.

As illustrated in FIG. 5C, the first layer 510 and the third layer 530 may be combined with each other. With respect to the same coordinate area, priority is determined in order of the third layer 530, second layer 520, and first layer 510.

In an example embodiment, the second layer 520 and/or third layer 530 may include a number of sub-layers defined for the top/bottom/left/right of the touch screen.

FIG. 6 and FIGS. 7A, 7B, 7C and 7D are diagrams illustrating an example method of combining touch area information according to various example embodiments of the present disclosure.

Figure 6:
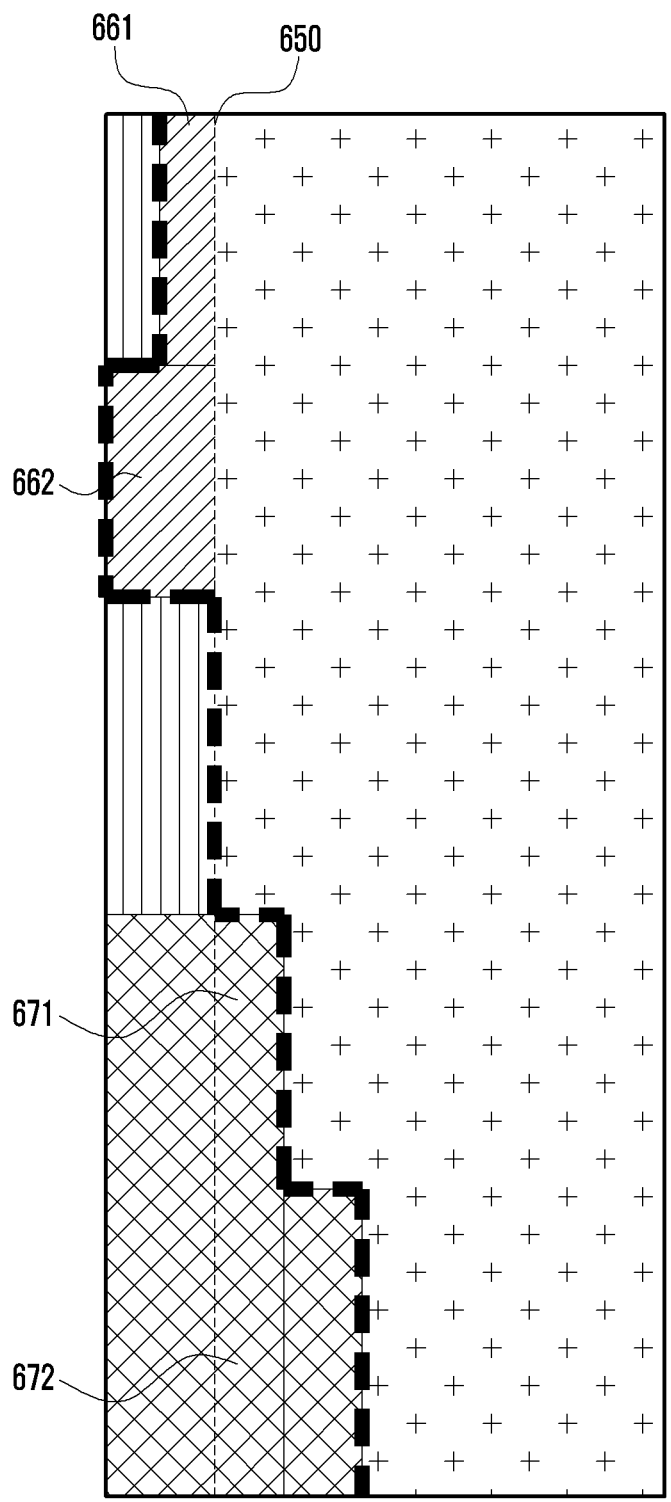
FIG. 6 and FIGS. 7A, 7B, 7C and 7D are diagrams illustrating an example method of combining touch area information according to various example embodiments of the present disclosure.

FIG. 6 is a diagram illustrating an example of part of the left area of a touch screen.

A dead zone may be an area between the left edge and the boundary line 650 in parallel along the left edge, at a distance (e.g., 10 pixels or 2 mm) from the left edge, according to a first layer.

If the first layer is combined with a second layer, a part 661 of the dead zone is removed in the left direction from the boundary line 650 of the first layer or the overall 662 of the dead zone is removed. If the first layer is combined with a third layer, parts 671 and 672 of the dead zone are extended in the right direction from the boundary line 650 of the first layer.

The first to third layers are combined with each other, and thus the left area from the dashed boundary is determined as a dead zone.

FIGS. 7A, 7B, 7C and 7D are diagrams illustrating an example method of combining first to third layers with each other, in order, for the touch screen.

Figure 7A:
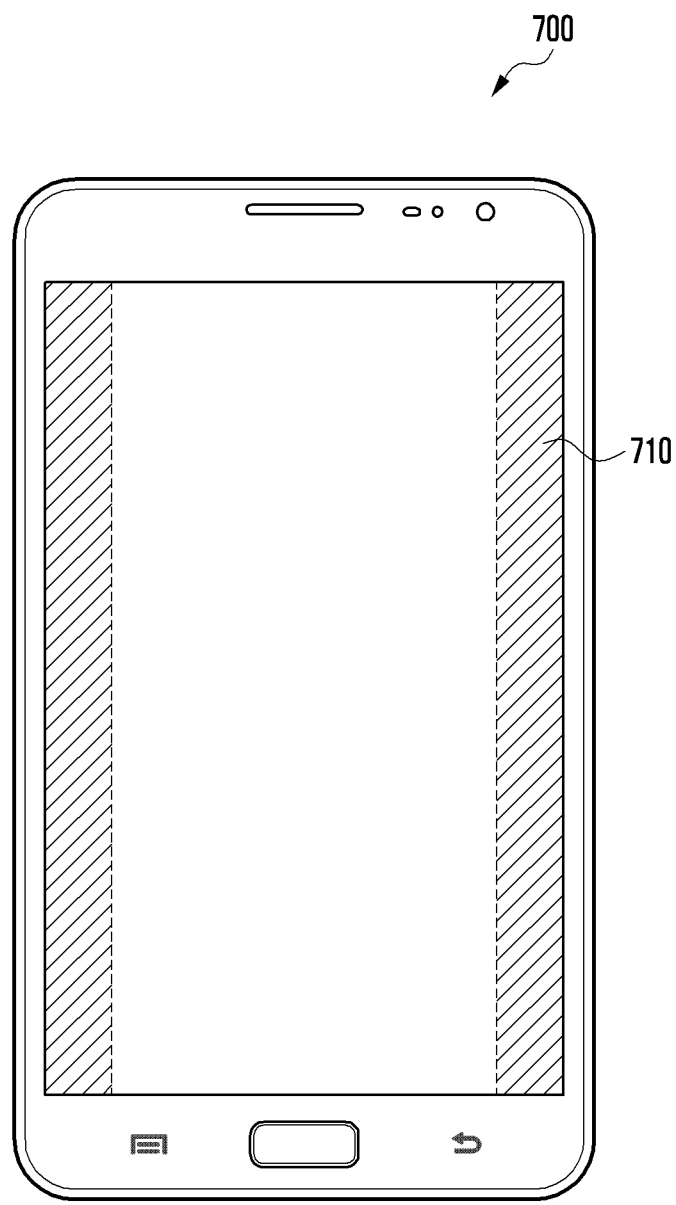

FIG. 7A illustrates a first layer 710. The first layer 710 may include a dead zone in parallel along with the left/right edges of the touch screen. As described above, if the processor does not receive attribute information from an application, it may create touch area information referring to a first layer 710 which is stored in a framework or in the electronic device, as a default.

Figure 7B:
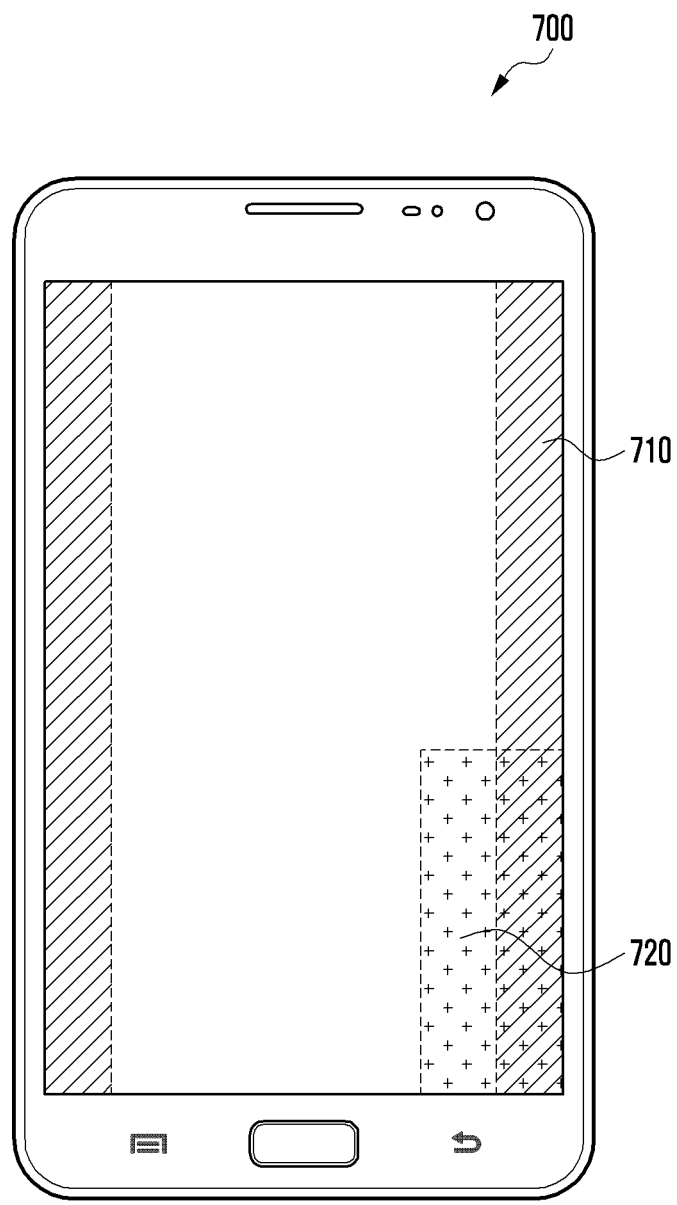

FIG. 7B illustrates a first layer 710 and a second layer 720. As described above, the second layer 720 may include information regarding a zone of the dead zone in the first layer 710, which needs to be altered to a normal zone, and may have higher priority than the first layer 710. The area of coordinates where the first layer 710 and the second layer 720 are superimposed (overlapped) and may be determined as a normal zone according to the second layer 720 whose priority is higher than the first layer 710. For example, although an area is set as a dead zone in the first layer 710, if the corresponding area is set as a normal zone in the second layer 720, the corresponding area may be determined as a normal zone. Therefore, the touch control circuit may create a touch event corresponding to the touch input applied to the corresponding area.

Figure 7C:
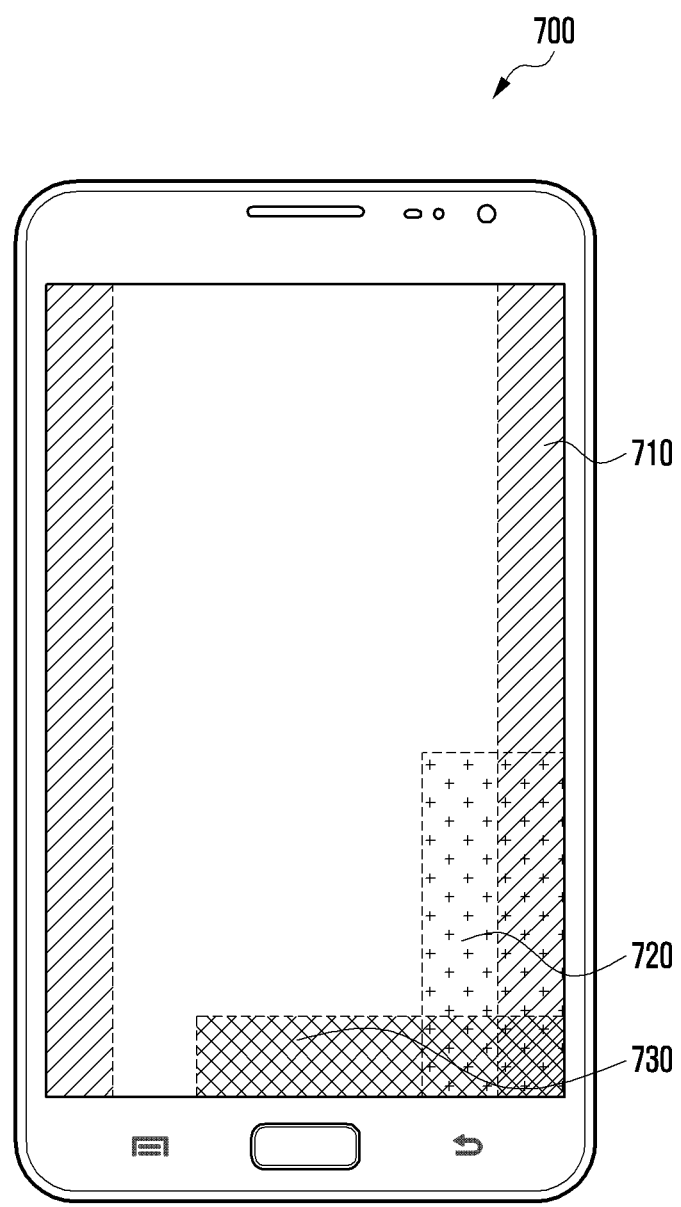

FIG. 7C illustrates a first layer 710, second layer 720 and third layer 730. As described above, the third layer 730 may include information regarding a zone of the normal zone in the first layer 710, which needs to be altered to a dead zone. If at least part of the first layer needs to be re-configured, the third layer 730 includes information regarding at least part of the area. The third layer 730 has higher priority than the first layer 710 and the second layer 720. An area defined as a dead zone in the third layer 730, among the area where the dead zone of the first layer 710 and the normal zone of the second layer 720 are superimposed, is determined as a dead zone.

Figure 7D:
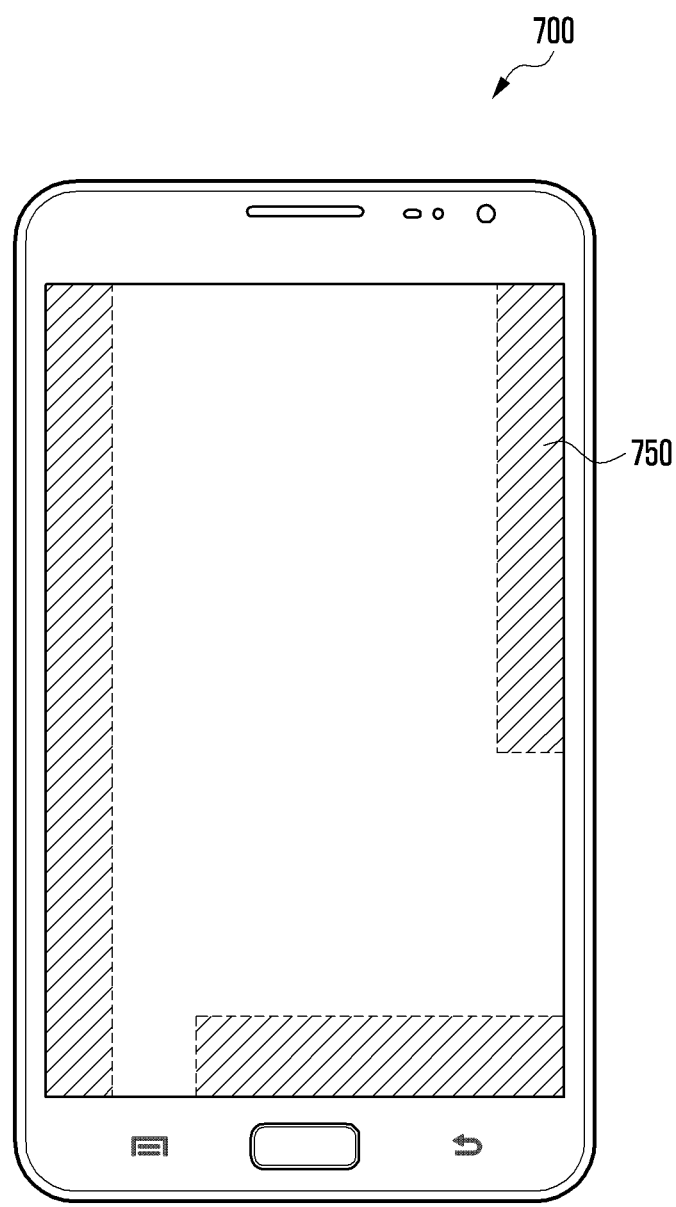

FIG. 7D is a diagram illustrating a dead zone 750, created by the combination of the first to third layers 710, 720, and 730 illustrated in FIGS. 7A, 7B and 7C.

Although the example embodiment is implemented to include only a normal zone and a dead zone as illustrated FIGS. 7A to 7C, the grip zone may also be determined according to the priority of the first to third layers.

Figure 8A:
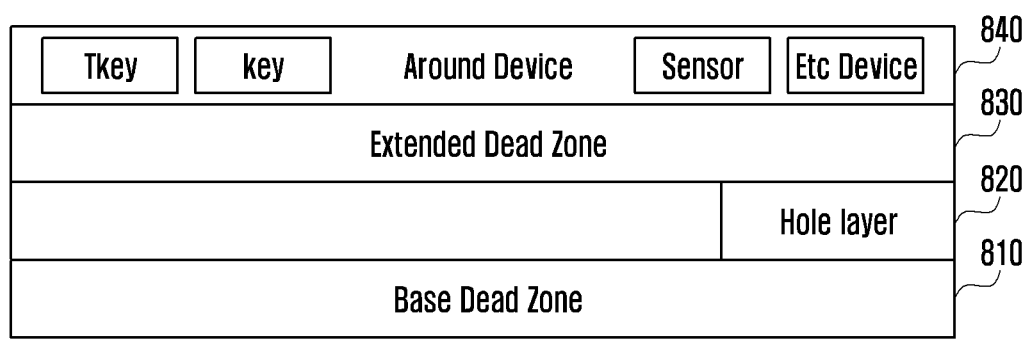
FIGS. 8A and 8B are diagrams illustrating example touch area information regarding edge areas of a touch screen according to various example embodiments of the present disclosure.
Figure 8B:
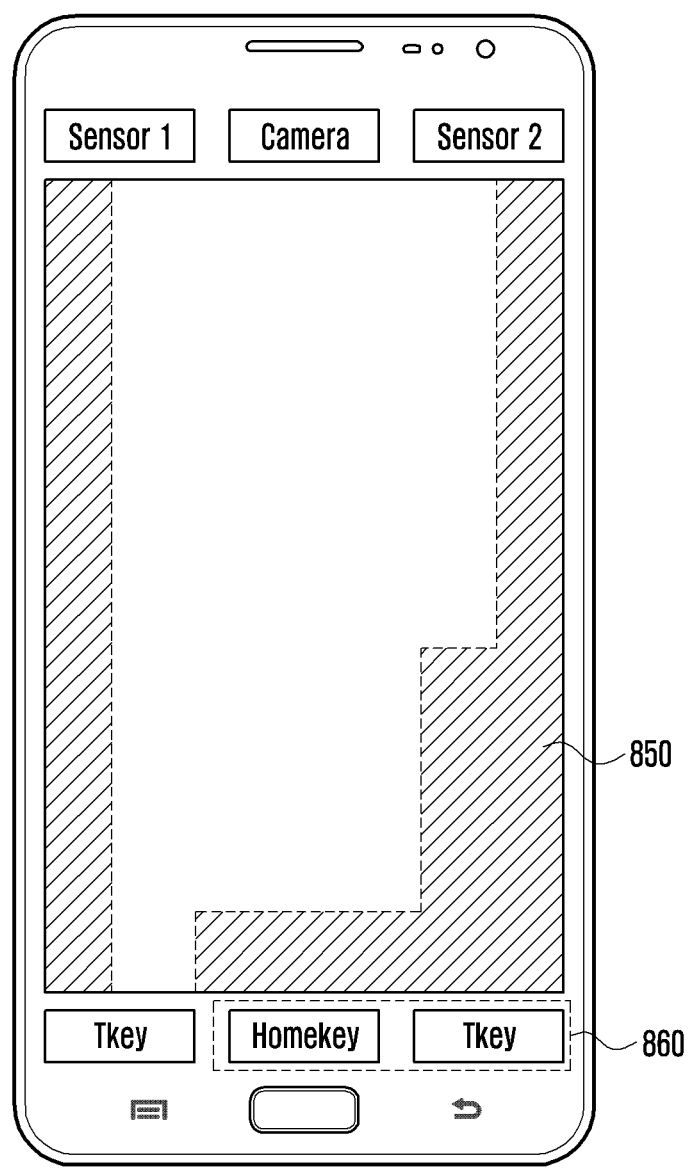

FIGS. 8A and 8B are diagrams illustrating example touch area information regarding edge areas of a touch screen according to various example embodiments of the present disclosure.

An electronic device is capable of including at least one key for sensing touch inputs at edges of the touch screen and a key control circuit (not shown) for creating a touch event according to the touch input detected by the key.

In an embodiment, touch area information may include information regarding a fourth layer for a dead zone of the key installed around the touch screen. A specified application may include a fourth layer where at least one of a number of keys is set as a dead zone so as not to recognize a touch applied to at least one of the keys. Like the second layer and the third layer, the fourth layer is included in attribute information of an application and transferred to the processor. When the processor receives attribute information, and updates touch area information including the fourth layer, it is capable of transferring the information to the touch control circuit and the key control circuit. In an embodiment, attributes of the fourth layer may be set according to peripheral devices (e.g., key, sensor, etc.), respectively.

The first to third layers 810, 820, and 830 illustrated in FIG. 8A may be the same as or similar to those of FIG. 5C. The fourth layer 840 includes a condition as to whether a touch input is applied to a key, a sensor, other devices, etc. around the touch screen. The fourth layer 840 may have higher priority than the first to third layers 810, 820, and 830.

The dead zone 850 of the touch screen illustrated in FIG. 8B may be the same as or similar to that of FIG. 7D. Homekey and Tkey 860 around the touch screen may be set to a dead zone in the fourth layer 840. In this case, although the key control circuit detects a touch input applied to Homekey and Tkey 860, it may not create a touch event. In an embodiment, the fourth layer 840 may include a parameter related to the alteration of a touch scan cycle for a specified area and/or a parameter related to the alteration of touch sensitivity. In this case, the touch scan cycle and/or the alteration of touch sensitivity may be determined according to corresponding parameters in the areas, respectively.

In an example embodiment, if a touch is applied to a Backkey for a period of time or more (e.g., 0.5 seconds or more) in a specified situation or when a specified application is executed, the electronic device considers the touch to be a user's gripping operation that the user does not intend to input, and thus may not create a touch event.

Figure 9:
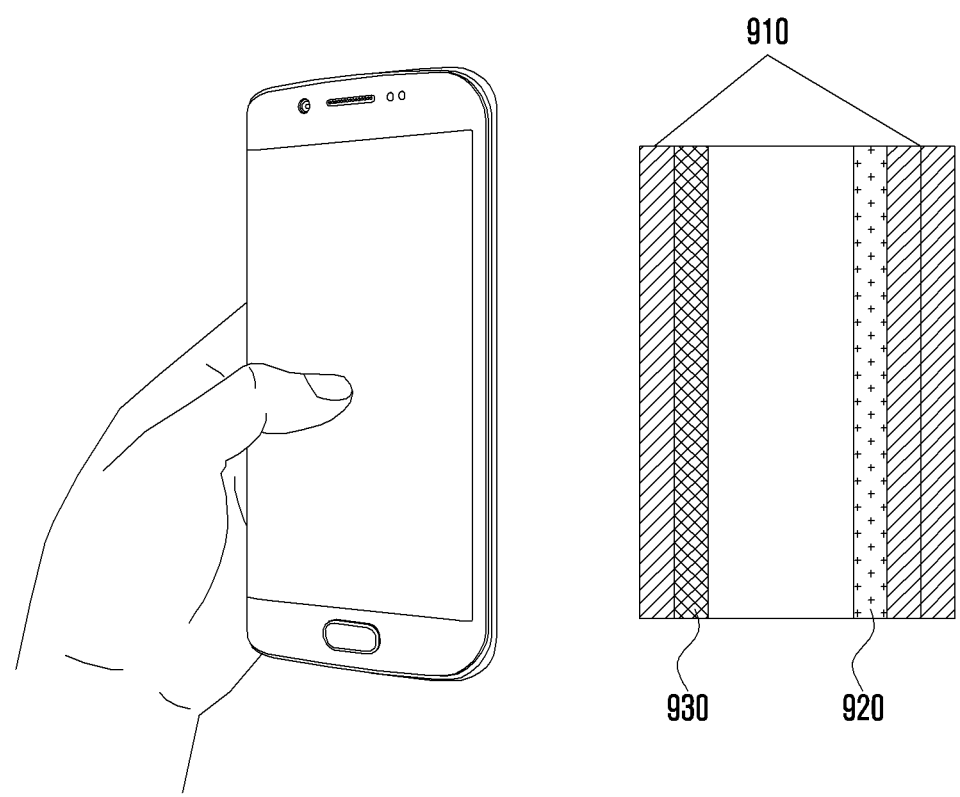
FIGS. 9 and 10 are diagrams illustrating an example method of altering touch area information based on sensed values according to various example embodiments of the present disclosure.
Figure 10:
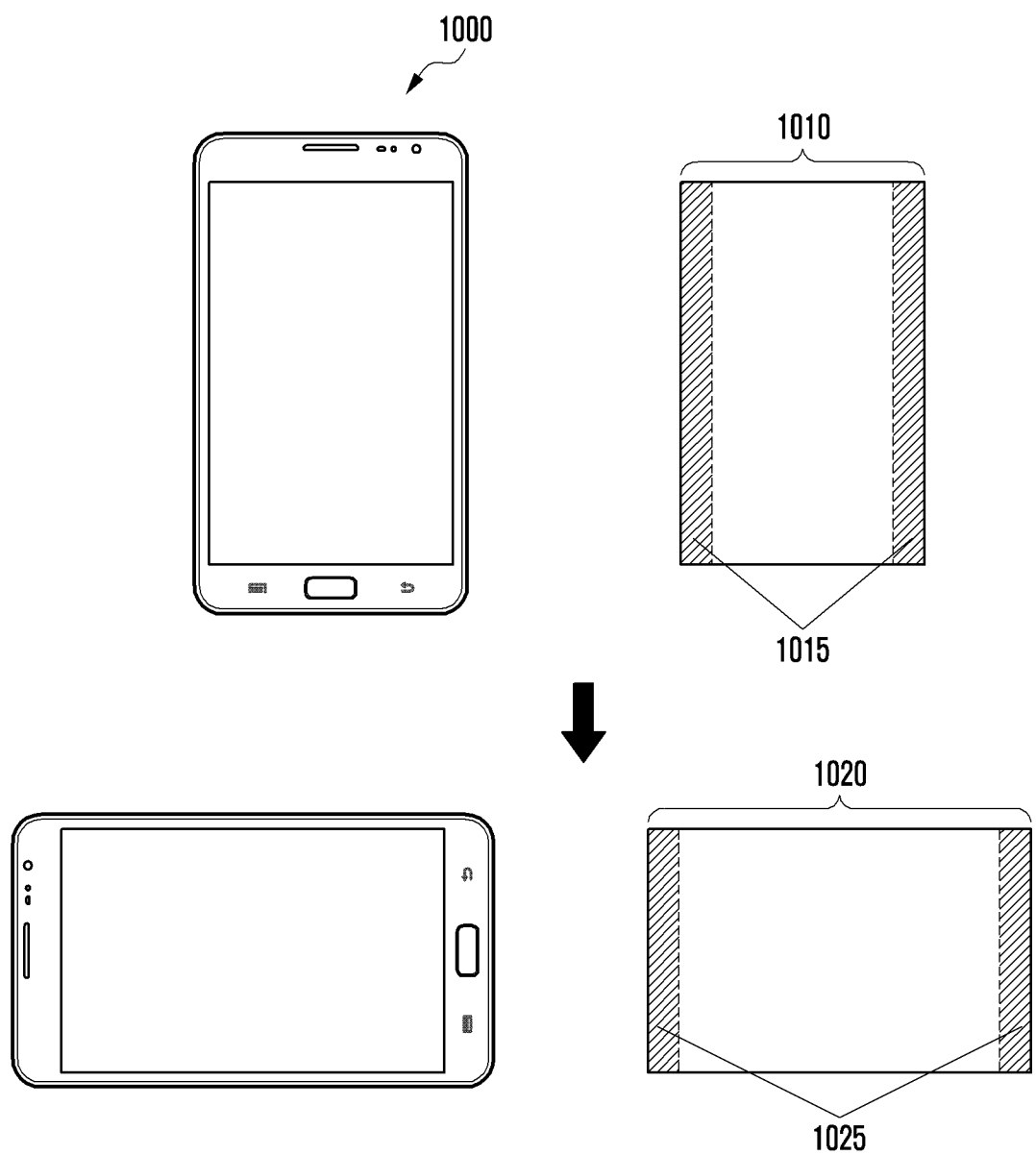

FIGS. 9 and 10 are diagrams illustrating an example method of altering touch area information according to sensed values according to various example embodiments of the present disclosure.

In an example embodiment, an electronic device is capable of including at least one sensor. The processor is capable of correcting a dead zone of a first layer, based on a sensed value of at least one sensor. Examples of the sensor are a tilt sensor, an acceleration sensor, a gravity sensor, etc. Examples of the sensed value are values corresponding to the orientation, tilt, moving speed, etc. of the electronic device.

The electronic device is capable of setting an area 910 of the left/right edge to a dead zone according to the first layer set as a default.

As illustrated in FIG. 9, if the user grips the electronic device with the left hand, the left edge of the electronic device may be gripped by the left hand. In this case, the electronic device is capable of ascertaining (determining) that: it is tilted in the left, via a sensed value of a tilt sensor, an acceleration sensor, etc.; and the left edge is gripped by the left hand, via a touch sensor installed to the left edge.

Since unintentional touches by a user's gripping operation may be frequently applied to the left edge of the touch screen, the processor may extend the area 910 of the left edge to an area 930 as a dead zone of the first layer, and reduce the area of the right edge by an area 920. Like the first layer, the third layer may alter its area. That is, the third layer may extend the area of the left edge, and reduce the area of the right edge.

In an embodiment, if the orientation of a screen displayed on the touch screen switches between landscape and portrait modes, e.g., from landscape mode to portrait mode or vice versa, the processor re-creates the touch area information.

As illustrated in FIG. 10, if the electronic device 1000 is in portrait mode 1010, the first layer may include a dead zone in the areas 1015 near the left/right edge. After that, if the orientation of the electronic device is changed from portrait mode to landscape mode, the first layer is also altered in such a way that the dead zone is created in the areas 1025 near the left/right edges in landscape mode, corresponding to the top/bottom edges of the screen in portrait mode 1020. Like the first layer, the processor may alter touch area information including the second layer and the third layer, based on the orientation of the electronic device.

In an embodiment, the processor is capable of identifying a type of object creating a touch, based on an area of the touch. For example, the processor may identify types of objects, e.g., stylus, finger, and glove, in order of touch area largest to smallest. The processor is capable of adjusting the area of a dead zone in at least one layer to be formed in touch area information, according to types of objects. For example, if the processor identifies a touch by a glove based on the area of the touch, it may extend a dead zone in at least one of the first to third layers. After that, if the processor ascertains that a touch is applied by the finger, it may reduce the extended dead zone to the original area.

Figure 11:
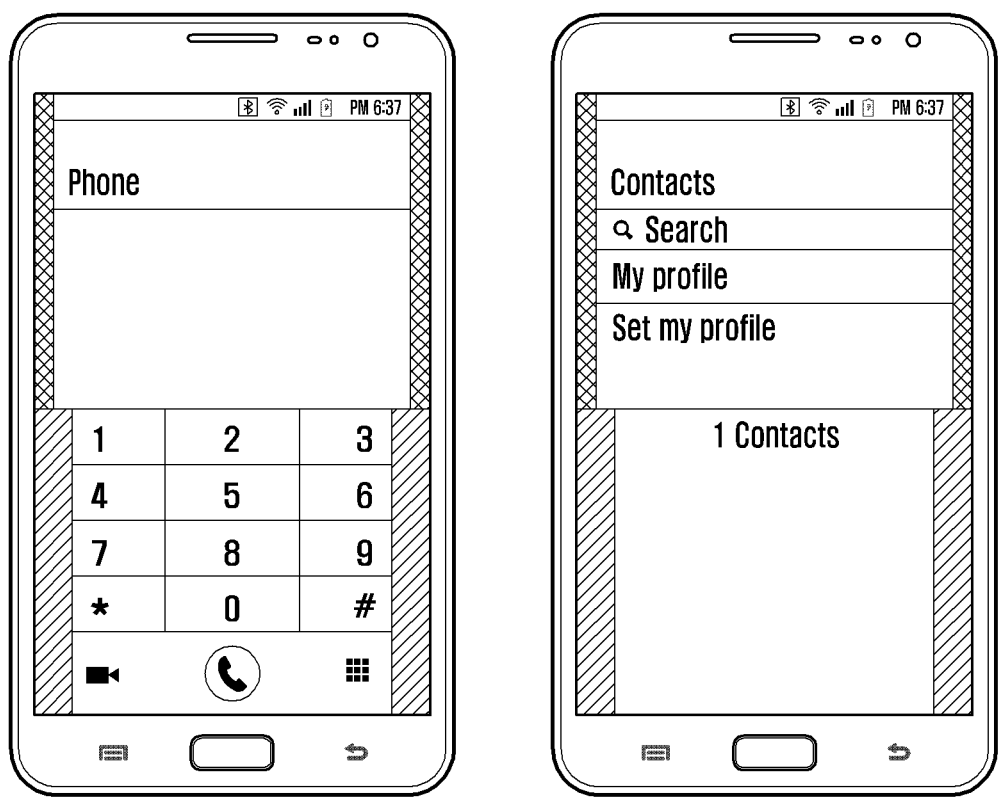
FIG. 11 is a diagram illustrating example screens displayed on a touch screen according to various example embodiments of the present disclosure.

FIG. 11 is a diagram illustrating example screens displayed on a touch screen according to various example embodiments of the present disclosure.

As illustrated in FIG. 11, an electronic device is capable of creating a relatively large dead zone near the left/right edge to which touch are frequently applied, based on the execution of an application. For example, a phone application of the electronic device may create a relatively large dead zone in a left/right edge of a keypad. The phone application is capable of providing the processor with a third layer including the extended dead zone of a corresponding area, as attribute information. This is to prevent the electronic device from mistaking an unintentional touch, which may be frequently applied to a corresponding area, for a correct touch.

In various example embodiments of the present disclosure, an electronic device is configured in such a way as to include: a touch screen; a processor electrically connected to the touch screen; a touch control circuit, electrically connected to the touch screen and the processor, for creating a touch event in response to a touch input detected on the touch screen; and a memory electrically connected to the processor. The processor is configured to execute at least one application stored in the memory, to determine attribute information of the executed application, to create touch area information containing an attribute corresponding to at least part of the area of the touch screen and information regarding at least part of the area of the touch screen, based on the attribute information, and to provide the touch area information to the touch control circuit. The touch control circuit is configured to determine whether a touch event corresponding to the detected touch input is created, based on the touch area information.

In various example embodiments, the touch area information includes information regarding coordinates of a dead zone where a touch event does not occur when a touch input is detected on the touch screen.

In various example embodiments, the touch area information further includes information regarding coordinates of a normal zone where a touch event occurs and information regarding coordinates of a grip zone for determining whether a touch event occurs based on a pattern of a touch input, when the touch input is detected.

In various example embodiments, the processor is configured to create the touch area information by combining a number of layers containing information related to an attribute corresponding to part of the area of the touch screen with each other.

In various example embodiments, the layers includes: a first layer including information regarding a dead zone where a touch event does not occur when a touch input is detected on the touch screen; a second layer including information regarding a zone of the dead zone in the first layer, which is to be altered to a normal zone; and a third layer including information regarding at least part of the first layer, which is to be reconfigured.

In various example embodiments, the second layer has high priority than the first layer, and the third layer has high priority than the first layer and the second layer, with respect to the same coordinate area.

In various example embodiments, the first layer is stored on a framework or, as a default, in the electronic device. The second layer and the third layer are included in the attribute information of the application.

In various example embodiments, the processor is configured to receive the attribute information when a screen is altered based on the execution of the application.

In various example embodiments, the electronic device may further include: at least one sensor. The processor is configured to correct or reconfigure a dead zone of the first or third layer, based on a sensed value of at least one sensor.

In various example embodiments, the processor is configured to recreate the touch area information if the orientation of a screen displayed on the touch screen switches between landscape and portrait modes, e.g., from landscape mode to portrait mode or vice versa.

In various example embodiments, the touch area information further includes information regarding a threshold of touch pressure which allows for the occurrence of the touch event on each of the zones.

In various example embodiments, the touch area information may further include a fourth layer including an attribute of at least one key installed within a predetermined proximity or distance to a touch screen or an attribute corresponding to at least part of the area of a peripheral device and at least part of the area of a peripheral device.

Figure 12:
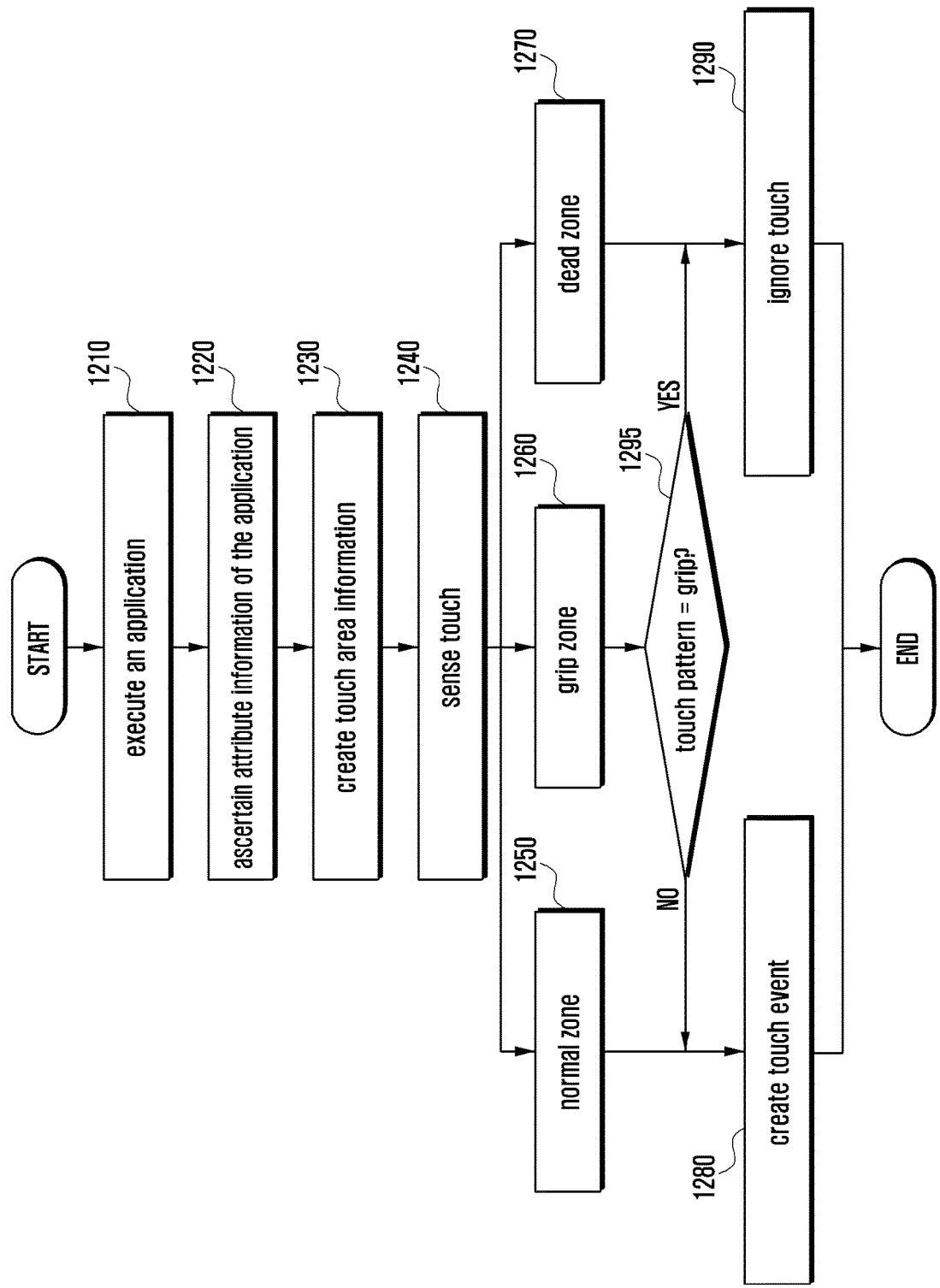
FIG. 12 is a flowchart illustrating an example method of processing touch events of an electronic device according to various example embodiments of the present disclosure.

FIG. 12 is a flowchart illustrating an example method of processing touch events of an electronic device according to various example embodiments of the present disclosure.

The method illustrated in FIG. 12 may be performed by the electronic device described above referring to FIGS. 1 to 11. Since the advantages and features of the electronic device were described above, a detailed description is not repeated below.

The electronic device is capable of executing an application in operation 1210.

The electronic device is capable of ascertaining (determining) attribute information of the executed application in operation 1220. The attribute information of the application may include information regarding dead zone and a grip zone to be applied to a corresponding application. The attribute information may be received each time that screen created by the application varies.

The electronic device senses a touch input via touch screen, and creates touch area information including information related to a dead zone where any touch event does not occur, based on attribute information of an application in operation 1230. In an embodiment, the touch area information may also include information related to a grip zone to determine whether a touch event occurs, according to a pattern of a touch input.

In an example embodiment, the electronic device is capable of creating touch area information by the combination of a number of layers including information related to a dead zone. For example, each of the layers may include information regarding coordinates of a dead zone, information regarding coordinates of a normal zone, and information regarding coordinates of a grip zone. Since the layers forming touch area information were described above referring to FIGS. 5 to 8, a detailed description is not repeated below.

In an example embodiment, the electronic device obtains at least part of a number of layers configuring touch area information from attribute information provided by an application, and other parts from information stored on a framework. For example, a first layer including information regarding a dead zone may be stored on a framework or in an area of the memory of the electronic device, as a default. If a specified application is not executed or attribute information is not provided from an application, the processor may create touch area information based on a first layer. An area not defined in a second layer and a third layer may be determined as a normal zone, a dead zone or a grip zone, according to a first layer.

The electronic device is capable of sensing a touch input applied to the touch screen in operation 1240. The electronic device is capable of determining whether it creates a touch event corresponding to the sensed touch input.

The electronic device is capable of determining whether an area to which the touch input is applied is a normal zone, a dead zone, or a grip zone, based on touch area information.

If the area to which the touch input is applied is a normal zone in operation 1250, the electronic device creates a touch event and provides the created touch event to the application in operation 1280.

If the area to which the touch input is applied is a dead zone in operation 1270, the electronic device ignores the touch input and does not provide a touch event to the application in operation 1290.

If the area to which the touch input is applied is a grip zone in operation 1260, the electronic device determines whether the touch pattern is a pattern of a gripping operation in operation 1295. If the electronic device determines that the touch pattern is a pattern of a gripping operation in operation 1295, it ignores the touch input and does not provide a touch event to the application in operation 1290. On the other hand, if the electronic device determines that the touch pattern is not a pattern of a gripping operation, or a pattern of a touch that the user intends to input in operation 1295, it creates a touch event in operation 1280.

In various example embodiments of the present disclosure, a method of processing touch events of an electronic device is configured in such a way as to include: executing at least one application; determining attribute information of the executed application; creating, when a touch input is detected on a touch screen, touch area information including an attribute corresponding to at least part of the area of the touch screen and information regarding at least part of the area of the touch screen, based on the attribute information; and determining whether a touch event corresponding to the detected touch input is created, based on the touch area information.

In various example embodiments, the touch area information includes information regarding coordinates of a dead zone where a touch event does not occur when a touch input is detected on the touch screen.

In various example embodiments, the touch area information further includes information regarding coordinates of a normal zone where a touch event occurs and information regarding coordinates of a grip zone for determining whether a touch event occurs according to a pattern of a touch input, when the touch input is detected.

In various example embodiments, creating the touch area information includes: creating the touch area information by combining a number of layers containing information related to an attribute corresponding to part of the area of the touch screen with each other.

In various example embodiments, the layers includes: a first layer including information regarding a dead zone where a touch event does not occur when a touch input is detected on the touch screen; a second layer including information regarding a zone of the dead zone in the first layer, which is to be altered to a normal zone; and a third layer including information regarding at least part of the first layer, which is to be reconfigured.

In various example embodiments, the second layer has high priority than the first layer, and the third layer has high priority than the first layer and the second layer, with respect to the same coordinate area.

In various example embodiments, the first layer is stored on a framework or, as a default, in the electronic device. The second layer and the third layer are included in the attribute information of the application.

In various example embodiments, determining the attribute information includes: receiving the attribute information when a screen is altered based on the execution of the application.

In various example embodiments, the method may further include: correcting or reconfiguring a dead zone of the first or third layer, based on a sensed value of at least one sensor installed to the electronic device.

As described above, the method and an electronic device according to various embodiments of the present disclosure are capable of setting a touch sensing area of a screen and processing touch events, based on attributes of the screen displayed on electronic devices.

While various example embodiments of the present disclosure have been described in detail above, it will be understood by those skilled in the art that the various example embodiments are intended to be illustrative, not limiting. Therefore, it will be understood that various modifications, variations and alternatives of the various example embodiments fall within the true spirit and full scope of the present disclosure as defined by the appended claims and their equivalents.

The invention claimed is:
1. An electronic device comprising:
a touch screen;
a processor electrically connected to the touch screen;
a touch control circuit, electrically connected to the touch screen and the processor, the touch control circuit configured to create a touch event in response to a touch input detected on the touch screen; and
a memory electrically connected to the processor,
wherein:
the processor is configured to:
execute at least one application stored in the memory,
determine attribute information of the executed application,
generate touch area information including a position of a partial area of the touch screen and an attribute corresponding to the partial area of the touch screen, based on the attribute information, and
provide the touch area information to the touch control circuit;
wherein the touch control circuit is configured to, when the touch input is detected, determine whether a touch event corresponding to the detected touch input is created, based on a position of the detected touch input and the touch area information, and
wherein the processor is configured to generate the touch area information by combining a plurality of layers including information related to the attribute corresponding to the partial area of the touch screen.

2. The electronic device of claim 1, wherein the touch area information comprises information regarding coordinates of a dead zone where a touch event does not occur when a touch input is detected on the touch screen.

3. The electronic device of claim 1, wherein the touch area information further comprises information regarding coordinates of a normal zone where a touch event occurs and information regarding coordinates of a grip zone for determining whether a touch event occurs based on a pattern of a touch input, when the touch input is detected.

4. The electronic device of claim 1, wherein the layers comprise:
a first layer including information regarding a dead zone where a touch event does not occur when a touch input is detected on the touch screen;
a second layer including information regarding a zone of the dead zone in the first layer, which is to be altered to a normal zone; and
a third layer including information regarding at least part of the first layer, which is to be reconfigured.

5. The electronic device of claim 4, wherein the second layer has a priority higher than a priority of the first layer, and the third layer has a priority higher than the priority of the first layer and the priority of the second layer, with respect to the same coordinate area.

6. The electronic device of claim 4, wherein:
the first layer is stored on a framework or, as a default, in the electronic device; and
the second layer and the third layer are included in the attribute information of the application.

7. The electronic device of claim 6, wherein the processor is configured to receive the attribute information when a screen is altered based on the execution of the application.

8. The electronic device of claim 6, further comprising:
at least one sensor,
wherein the processor is configured to reconfigure a dead zone of the first or third layer, based on a sensed value of at least one sensor.

9. The electronic device of claim 8, wherein the processor is configured to recreate the touch area information if the orientation of a screen displayed on the touch screen switches between landscape and portrait modes.

10. The electronic device of claim 2, wherein the touch area information further comprises information regarding a threshold of touch pressure for the occurrence of the touch event on each of the zones.

11. A method of processing touch events of an electronic device comprising:
   executing at least one application;
   determining attribute information of the executed application;
   generating touch area information including a position of a partial area of the touch screen and an attribute corresponding to the partial area of the touch screen, based on the attribute information;
   when the touch input is detected, determining whether a touch event corresponding to the detected touch input is created, based on a position of the detected touch input and the touch area information,
   wherein generating of the touch area information comprises generating the touch area information by combining a plurality of layers including information related to the attribute corresponding to the partial area of the touch screen.

12. The method of claim 11, wherein the touch area information comprises information regarding coordinates of a dead zone where a touch event does not occur when a touch input is detected on the touch screen.

13. The method of claim 12, wherein the touch area information further comprises information regarding coordinates of a normal zone where a touch event occurs and information regarding coordinates of a grip zone for determining whether a touch event occurs based on a pattern of a touch input, when the touch input is detected.

14. The method of claim 11, wherein the layers comprise:
   a first layer including information regarding a dead zone where a touch event does not occur when a touch input is detected on the touch screen;
   a second layer including information regarding a zone of the dead zone in the first layer, which is to be altered to a normal zone; and
   a third layer including information regarding at least part of the first layer, which is to be reconfigured.

15. The method of claim 14, wherein the second layer has a priority higher than a priority of the first layer, and the third layer has a priority higher than the priority of the first layer and the priority of the second layer, with respect to the same coordinate area.

16. The method of claim 14, wherein:
   the first layer is stored on a framework or, as a default, in the electronic device; and
   the second layer and the third layer are included in the attribute information of the application.

17. The method of claim 16, wherein determining the attribute information comprises:
   receiving the attribute information when a screen is altered based on the execution of the application.

18. The method of claim 16, further comprising:
   reconfiguring a dead zone of the first or third layer, based on a sensed value of at least one sensor installed in the electronic device.

* * * * *